US012694665B2

(12) United States Patent
Heinzl et al.

(10) Patent No.: US 12,694,665 B2
(45) Date of Patent: Jul. 28, 2026

(54) COMPUTER-IMPLEMENTED METHOD FOR CLASSIFYING WASTE

(71) Applicant: Brantner Environment Group GmbH, Krems (AT)

(72) Inventors: Rene Heinzl, Wein (AT); Christoph Pasching, Loosdorf (AT)

(73) Assignee: Brantner Environment Group GmBh, Krems (AT)

( * ) Notice: Subject to any disclaimer, the term of this patent is extended or adjusted under 35 U.S.C. 154(b) by 247 days.

(21) Appl. No.: 18/689,346

(22) PCT Filed: Sep. 7, 2022

(86) PCT No.: PCT/AT2022/060305
§ 371 (c)(1),
(2) Date: Mar. 5, 2024

(87) PCT Pub. No.: WO2023/035020
PCT Pub. Date: Mar. 16, 2023

(65) Prior Publication Data
US 2025/0209790 A1     Jun. 26, 2025

(30) Foreign Application Priority Data

Sep. 7, 2021     (AT) .............................. A 50704/2021

(51) Int. Cl.
*G06V 10/764*          (2022.01)
*G06F 3/04845*          (2022.01)
(Continued)

(52) U.S. Cl.
CPC ........ *G06V 10/764* (2022.01); *G06F 3/04845* (2013.01); *G06F 3/0488* (2013.01); *G06T 11/60* (2013.01); *G06V 2201/07* (2022.01)

(58) Field of Classification Search
CPC ...... G06V 10/82; G06V 10/764; G06V 20/60; G06V 2201/07; G06T 11/60; G06F 3/04845; G06F 3/0488
See application file for complete search history.

(56) References Cited

U.S. PATENT DOCUMENTS

2021/0035146 A1     2/2021     Odom

FOREIGN PATENT DOCUMENTS

CN          110569874 A          12/2019
CN          110852263 A     *     2/2020     .............. G06N 3/08
(Continued)

OTHER PUBLICATIONS

Nowakowski, Piotr, and Teresa Pamuła. "Application of deep learning object classifier to improve e-waste collection planning." Waste Management 109 (2020): 1-9. (Year: 2020).*
(Continued)

*Primary Examiner* — Tracy Mangialaschi
(74) *Attorney, Agent, or Firm* — Faustino Lichauco; Leber IP Law

(57)          ABSTRACT

A computer-implemented method for classifying waste into predefined waste categories $K_1, K_2, \ldots, K_n$ using an image recording unit and a data processing unit, the method comprising the following steps: recording, by way of the image recording unit, an image of unseparated waste to be separated comprising waste objects; detecting, by way of a neural image recognition network connected to the data processing unit or integrated in the data processing unit, the waste objects depicted in the image; classifying at least one of the waste objects into one of the predefined waste categories $K_1, K_2, \ldots, K_n$; wherein the waste objects are classified into one of the predefined waste categories $K_1, K_2, \ldots, K_n$ on the basis of a geographical location P, in
(Continued)

particular the geographical location of the image recording unit or of the unseparated waste.

11 Claims, 1 Drawing Sheet

(51) Int. Cl.
G06F 3/0488 (2022.01)
G06T 11/60 (2026.01)

(56) References Cited

FOREIGN PATENT DOCUMENTS

| CN | 111814026 A | * | 10/2020 | ........... | G06F 18/214 |
| CN | 110852263 B | | 8/2021 | | |

OTHER PUBLICATIONS

"Recycle Coach Demo Video", City of Harrisburg, www.youtube.com/watch?v=513EfQfv1Co, Jun. 13, 2018, 2 pages.

Narayan, "DeepWaste: Applying Deep Learning to Waste Classification for a Sustainable Planet", 34th Conference on Neural Information Processing Systems (2020), Jan. 15, 2021, 4 pages.

Nowakowski; et al., "Application of deep learning object classifier to improve e-waste collection planning", Waste Management, Apr. 28, 2020, vol. 109, pp. 1-9.

Patil; et al., "Garbage Classifying Application Using Deep Learning Techniques", IEEE, https://ieeexplore.ieee.org/document/9573599/metrics#metrics, retrieved on line Jun. 15, 2022, 3 pages.

International Patent Application No. PCT/AT2022/060305, English Translation of Search Report dated Dec. 6, 2022, 2 pages.

* cited by examiner

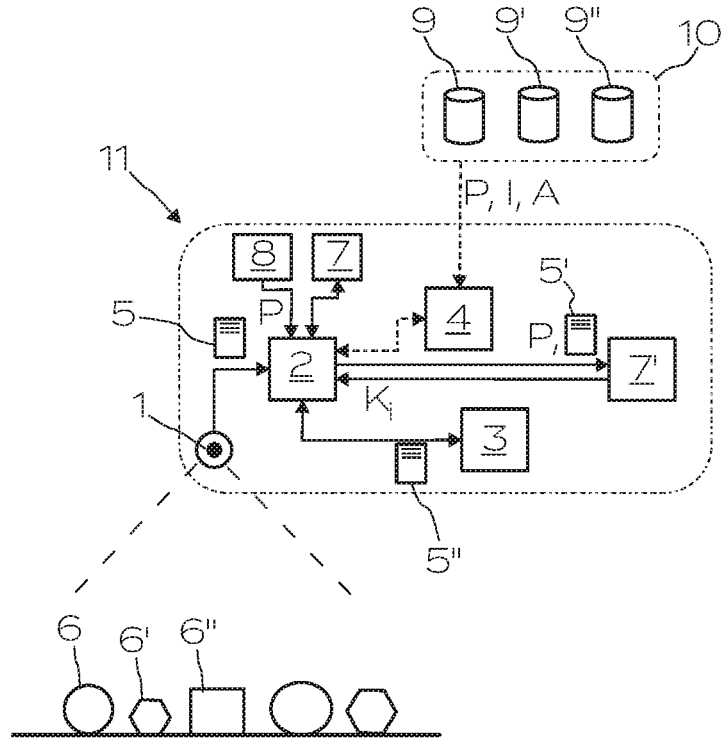

COMPUTER-IMPLEMENTED METHOD FOR CLASSIFYING WASTE

RELATED APPLICATIONS

This application is a national phase entry of International Patent Application No. PCT/AT2022/060305, filed Sep. 6, 2022, which claims priority from Austrian Patent Application No A50704/2021, filed Sep. 7, 2021, the entire disclosures of which are incorporated herein by reference.

BACKGROUND

The invention relates to a computer-implemented method for classifying waste.

It is known from the prior art to classify unseparated waste comprising a plurality of various objects into predefined waste categories. For example, unseparated waste can be divided into recyclable waste such as glass, PET bottles, beverage cans, batteries, wood and metals as well as organic waste and residual waste. Usually, the classification is done manually in private households and offices.

However, manually classifying waste results in the substantial problem that different geographical locations provide a different number of waste categories, which may optionally also be defined differently. One geographical region may, for example, provide three waste categories (residual waste, organic waste, paper), whereas another geographical region may provide five waste categories (residual waste, organic waste, paper, plastic, glass). Some regions may provide a first waste category (e.g., residual waste) for the disposal of certain waste objects (e.g., beverage cartons), while other regions provide a different waste category (e.g., plastic) for the same waste objects. That is why, manual classification of waste objects in unseparated waste into waste categories is difficult and prone to error.

It is the object of the invention to overcome these and other problems of conventional methods for classifying waste and to provide a method for classifying waste that allows the user to quickly and correctly classify the waste objects in unseparated waste.

SUMMARY

A computer-implemented method according to the invention is used to classify waste into predefined waste categories $K_1, K_2, \ldots, K_n$ using an image recording unit and a data processing unit. The image recording unit may be a photo or video camera, a ToF (time of flight) camera or similar. The image recording unit may also comprise a plurality of cameras arranged at different distances or angles from each other. The data processing unit may be designed as a microcontroller or microcomputer and comprise a central processing unit (CPU), a volatile semiconductor memory (RAM), a non-volatile semiconductor memory (ROM, SSD hard disk), a magnetic memory (hard disk) and/or an optical memory (CD-ROM) as well as interface units (Ethernet, USB) and the like. The components of such data processing units are known to the skilled person.

A method according to the invention comprises the following steps:

In a first step, the image recording unit creates a recording in the form of at least one image or video of unseparated waste to be separated, which comprises one or more waste objects.

In a second step, a neural image recognition network connected to the data processing unit or integrated in the data processing unit detects the waste objects depicted in the image. Conventional neural image recognition networks that specialise in the detection of objects in images may be provided.

In a next step, at least one of the detected waste objects is classified into one of the predefined waste categories $K_1, K_2, \ldots, K_n$. It may be provided that the waste categories $K_1, K_2, \ldots, K_n$ are stored in a memory of the data processing unit in advance.

The data processing unit and the neural image recognition network may be arranged preferably entirely in a smartphone. However, it may also be provided that the data processing unit is arranged in a smartphone, and communicates via an interface, for example a wireless connection, with an external server, for example a server on the Internet, on which the neural image recognition network is located. In particular, the neural image recognition network may be provided as a software module in the data processing unit, in a computer separate from the data processing unit or in an external server.

According to the invention, it may be particularly provided that the image recognition network or the data processing unit (2) creates from the image individual image sections with detected waste objects and uses them for further classification.

According to the invention, it is provided that the waste objects are classified on the basis of a geographical location P, in particular on the basis of the geographical location of the image recording unit or the recorded unseparated waste. This ensures that the relationship between the waste object, the geographical location and the waste category is taken into account.

In particular, it may be provided that a database, which is connected to the data processing unit (2) or integrated in the data processing unit (2) and in which a relationship between the location P, a number of predefined waste objects (6, 6', 6") and the predefined waste categories $K_1, K_2, \ldots, K_n$ is stored, is used to classify the waste objects (6, 6', 6") into one of the predefined waste categories $K_1, K_2, \ldots, K_n$. For example, this database may contain the information that in a certain city electrical appliances always belong to hazardous waste.

Alternatively, it may be provided that a neural waste classification network connected to the data processing unit or integrated in the data processing unit is used for the classification of waste objects.

For robust detection and classification of the waste objects, the waste classification network may be trained in advance with training data that maps a relationship between the location P, predefined waste objects and the waste categories $K_1, K_2, \ldots, K_n$. In particular, the training data may comprise photos of different waste objects, different geographical locations, and the waste category that is assigned based on the location. This means that the same waste object may fall in different waste categories depending on its location; the neural waste classification network was adapted in advance with corresponding training data to recognize this relationship.

By combining the data from the image recognition with the geographical location of the unseparated waste according to the invention, it is possible to immediately provide the user with information as to in which waste category the waste objects of the unseparated waste fall. As a result, the user does not need to research local rules at their geographical location but can immediately have the waste objects disposed of correctly.

According to the invention, it may be provided that the geographical location P is provided by a location sensor connected to the data processing unit. This may be a location sensor integrated into a smartphone, for example, a GPS sensor.

According to the invention, it may also provided that the geographical location P is provided by a database connected to the data processing unit via a communication unit, in particular by a database located on a server on the Internet, on the basis of user data stored in the data processing unit. For example, the home address of a user employing the method may be stored in the database and used as location.

According to the invention, it may be provided that the data processing unit creates a modified image and displays the modified image on the user interface, especially on the touch screen of the smartphone. The modified image may have markings that highlight the waste objects detected in the image for the user, for example by adding a frame. The user may then be prompted to select at least one of the highlighted waste objects in the modified image, whereupon the waste category $K_1$, $K_2$, . . . , $K_n$ of the selected waste object is displayed on the user interface. This provides the user with specific information about the selected waste objects.

According to the invention, it may further be provided that information about the disposal of the selected waste object is displayed by querying a database connected to the data processing unit via a communication unit, in particular a database located on a server on the Internet. In particular, for the waste object selected by the user, information about the determined waste category and its handling according to the location may be displayed on the user interface.

Further, it may be provided that the data processing unit selects a local provider for the disposal of the waste object by querying a database connected to the data processing unit via a communication unit and displays the determined provider on the user interface.

Particularly advantageously, the data processing unit may send an electronic order to this provider for the disposal of the waste object via the communication unit.

The invention further relates to a computer-readable storage medium comprising instructions which cause an electronic device comprising an image recording unit and a data processing unit and optionally a user interface and optionally a communication unit to employ a method according to the invention.

The invention further relates to a device for classifying waste comprising an image recording unit, a data processing unit, optionally a user interface and optionally a communication unit, wherein the device is configured to employ a method according to the invention. Particularly, the device may be a mobile phone, preferably a smartphone.

Further features according to the invention result from the claims, the embodiments and the FIGURES.

In the following, the invention is described with reference to an exemplary and non-exclusive embodiment.

BRIEF DESCRIPTION OF THE DRAWINGS

FIG. 1 shows an exemplary embodiment of a method according to the invention with reference to a block diagram.

DETAILED DESCRIPTION

The schematic block diagram in FIG. 1 shows a smartphone 11 with an image recording unit 1 in the form of a camera, a data processing unit 2, a user interface 3 in the form of a touch screen and a communication unit 4 in the form of a mobile communication interface or WLAN interface. Further, a location sensor 8 is provided in smartphone 11.

Further, unseparated waste including a plurality of waste objects 6, 6', 6", for example, organic waste, and objects made of metal, glass, and plastic, is shown. The smartphone 11 uses the image recording unit 1 to create an image 5 of the unseparated waste and transmits this image 5 to the data processing unit 2.

The data processing unit 2 is connected to a neural image recognition network 7, to which it transmits the image 5. The data processing unit 2 also receives the current geographical location P of the smartphone 11 from an integrated location sensor 8.

In other embodiments of the invention the geographical location P is provided by a database 9 connected to the data processing unit 2 via a communication unit 4, i.e. a database 9 located on a server 10 on the Internet. For this purpose, the data processing unit 2 transmits the user data of the current user to the server 10, whereupon data on the location of the user stored in the database 9 (e.g., home address) is provided. This kind of communication is schematically indicated in FIG. 1, as it is not mandatory for each embodiment of the invention.

The data processing unit 2 receives information about the waste objects 6, 6', 6" detected in the image 5 from the image recognition network 7, e.g., that they are a beverage can, a battery and a banana peel, respectively. The data processing unit 2 creates from the image 5 a series of image sections 5', each of which contains the relevant waste objects 6, 6', 6", and transmits these image sections 5' together with the location P to a neural waste classification network 7'. In other embodiments not described herein, it may be provided that the classification is done by way of a database connected to the data processing unit 2 instead of using a neural network.

On the basis of the transmitted image sections 5' and the geographical location P, the neural waste classification network 7' now classifies the waste objects 6, 6', 6" detected in image 5 into predefined waste categories $K_1$, $K_2$, . . . , $K_n$.

The neural waste classification network 7' was trained in advance using training data specially adapted for detecting waste objects. For this purpose, the training data of the neural waste classification network 7' provided according to the invention comprises not only photos of various objects (organic waste, glass, plastic, paper, metal, batteries, etc.), but also their respective assignment to predefined waste categories depending on the geographical location P. For example, the waste object "metal" is assigned to the waste category $K_7$ at a first location $P_1$, whereas it is assigned to the waste category $K_3$ at a second location $P_2$.

The waste category $K_i$ determined by the neural waste classification network 7' is transmitted back to the data processing unit 2. Then the data processing unit 2 creates a modified image 5", which is an overlay of the original image 5 with the detected waste objects 6, 6', 6". For example, in the modified image 5", each waste object detected in the unseparated waste may have a visually prominent frame or the like in order to make it clear to the user that this object marked in this way has been detected as a waste object 6, 6', 6".

The modified image 5" is transmitted to the user interface 3, namely to the touch screen of the smartphone 11, and the user is prompted to select at least one of the waste objects 6, 6', 6" marked in the modified image 5". When the user selects one of the marked waste objects 6, 6', 6", the waste category $K_1$, $K_2$, . . . , $K_n$ of the selected waste object 6, 6', 6" is displayed on the user interface 3, so that the user receives basic information as to which waste category $K_i$ the selected waste object belongs to at their location.

The data processing unit 2 then establishes a connection with an external database 9', which is located on a server on the Internet 10, via the communication unit 4. The data processing unit 2 transmits the determined waste category $K_i$ and the location P and receives information I from the database 9' regarding the disposal of the corresponding waste category $K_i$ at the specific location P. This information I is received by the data processing unit 2 and displayed on the user interface 3. This provides the user with detailed information on how to deal with the determined waste category $K_i$ at his location. This may include e.g., information about nearby collection centres or collection days of this waste category.

Further, the data processing unit 2 establishes a connection with an external database 9", which is located on a server on the Internet 10, via the communication unit 4. The data processing unit 2 transmits the waste category $K_i$ and the location P and receives information from the database 9' regarding the local provider for disposal of the waste category $K_i$ at the specific location P.

This information A is received by the data processing unit 2 and displayed on the user interface 3.

In other embodiments not shown herein, it may be provided that, via communication unit 4, the data processing unit 2 sends an electronic order to one of the determined providers A for disposal of the waste object 6, 6', 6" selected by the user.

The invention is not limited to the described exemplary embodiments, but also comprises further embodiments of the present invention within the scope of the following patent claim.

Computer-Implemented Method for Classifying Waste

The invention relates to a computer-implemented method for classifying waste.

It is known from the prior art to classify unseparated waste comprising a plurality of various objects into predefined waste categories. For example, unseparated waste can be divided into recyclable waste such as glass, PET bottles, beverage cans, batteries, wood and metals as well as organic waste and residual waste. Usually, the classification is done manually in private households and offices.

However, manually classifying waste results in the substantial problem that different geographical locations provide a different number of waste categories, which may optionally also be defined differently. One geographical region may, for example, provide three waste categories (residual waste, organic waste, paper), whereas another geographical region may provide five waste categories (residual waste, organic waste, paper, plastic, glass). Some regions may provide a first waste category (e.g., residual waste) for the disposal of certain waste objects (e.g., beverage cartons), while other regions provide a different waste category (e.g., plastic) for the same waste objects. That is why, manual classification of waste objects in unseparated waste into waste categories is difficult and prone to error.

It is the object of the invention to overcome these and other problems of conventional methods for classifying waste and to provide a method for classifying waste that allows the user to quickly and correctly classify the waste objects in unseparated waste.

According to the invention, this and other problems are solved by a method according to claim 1.

A computer-implemented method according to the invention is used to classify waste into predefined waste categories $K_1$, $K_2$, . . . , $K_n$ using an image recording unit and a data processing unit. The image recording unit may be a photo or video camera, a ToF (time of flight) camera or similar. The image recording unit may also comprise a plurality of cameras arranged at different distances or angles from each other. The data processing unit may be designed as a microcontroller or microcomputer and comprise a central processing unit (CPU), a volatile semiconductor memory (RAM), a non-volatile semiconductor memory (ROM, SSD hard disk), a magnetic memory (hard disk) and/or an optical memory (CD-ROM) as well as interface units (Ethernet, USB) and the like. The components of such data processing units are known to the skilled person.

A method according to the invention comprises the following steps:

In a first step, the image recording unit creates a recording in the form of at least one image or video of unseparated waste to be separated, which comprises one or more waste objects.

In a second step, a neural image recognition network connected to the data processing unit or integrated in the data processing unit detects the waste objects depicted in the image. Conventional neural image recognition networks that specialise in the detection of objects in images may be provided.

In a next step, at least one of the detected waste objects is classified into one of the predefined waste categories $K_1$, $K_2$, . . . , $K_n$. It may be provided that the waste categories $K_1$, $K_2$, . . . , $K_n$ are stored in a memory of the data processing unit in advance.

The data processing unit and the neural image recognition network may be arranged preferably entirely in a smartphone. However, it may also be provided that the data processing unit is arranged in a smartphone, and communicates via an interface, for example a wireless connection, with an external server, for example a server on the Internet, on which the neural image recognition network is located. In particular, the neural image recognition network may be provided as a software module in the data processing unit, in a computer separate from the data processing unit or in an external server.

According to the invention, it may be particularly provided that the image recognition network or the data processing unit (2) creates from the image individual image sections with detected waste objects and uses them for further classification.

According to the invention, it is provided that the waste objects are classified on the basis of a geographical location P, in particular on the basis of the geographical location of the image recording unit or the recorded unseparated waste. This ensures that the relationship between the waste object, the geographical location and the waste category is taken into account.

In particular, it may be provided that a database, which is connected to the data processing unit (2) or integrated in the data processing unit (2) and in which a relationship between the location P, a number of predefined waste objects (6, 6', 6") and the predefined waste categories $K_1$, $K_2$, . . . , $K_n$ is stored, is used to classify the waste objects (6, 6', 6") into one of the predefined waste categories $K_1$, $K_2$, . . . , $K_n$. For example, this database may contain the information that in a certain city electrical appliances always belong to hazardous waste.

Alternatively, it may be provided that a neural waste classification network connected to the data processing unit or integrated in the data processing unit is used for the classification of waste objects.

For robust detection and classification of the waste objects, the waste classification network may be trained in advance with training data that maps a relationship between the location P, predefined waste objects and the waste categories $K_1$, $K_2$, . . . , $K_n$. In particular, the training data may comprise photos of different waste objects, different geographical locations, and the waste category that is assigned based on the location. This means that the same waste object may fall in different waste categories depending on its location; the neural waste classification network was adapted in advance with corresponding training data to recognize this relationship.

By combining the data from the image recognition with the geographical location of the unseparated waste according to the invention, it is possible to immediately provide the user with information as to in which waste category the waste objects of the unseparated waste fall. As a result, the user does not need to research local rules at their geographical location but can immediately have the waste objects disposed of correctly.

According to the invention, it may be provided that the geographical location P is provided by a location sensor connected to the data processing unit. This may be a location sensor integrated into a smartphone, for example, a GPS sensor.

According to the invention, it may also provided that the geographical location P is provided by a database connected to the data processing unit via a communication unit, in particular by a database located on a server on the Internet, on the basis of user data stored in the data processing unit. For example, the home address of a user employing the method may be stored in the database and used as location.

According to the invention, it may be provided that the data processing unit creates a modified image and displays the modified image on the user interface, especially on the touch screen of the smartphone. The modified image may have markings that highlight the waste objects detected in the image for the user, for example by adding a frame. The user may then be prompted to select at least one of the highlighted waste objects in the modified image, whereupon the waste category $K_1$, $K_2$, . . . , $K_n$ of the selected waste object is displayed on the user interface. This provides the user with specific information about the selected waste objects.

According to the invention, it may further be provided that information about the disposal of the selected waste object is displayed by querying a database connected to the data processing unit via a communication unit, in particular a database located on a server on the Internet. In particular, for the waste object selected by the user, information about the determined waste category and its handling according to the location may be displayed on the user interface.

Further, it may be provided that the data processing unit selects a local provider for the disposal of the waste object by querying a database connected to the data processing unit via a communication unit and displays the determined provider on the user interface.

Particularly advantageously, the data processing unit may send an electronic order to this provider for the disposal of the waste object via the communication unit.

The invention further relates to a computer-readable storage medium comprising instructions which cause an electronic device comprising an image recording unit and a data processing unit and optionally a user interface and optionally a communication unit to employ a method according to the invention.

The invention further relates to a device for classifying waste comprising an image recording unit, a data processing unit, optionally a user interface and optionally a communication unit, wherein the device is configured to employ a method according to the invention. Particularly, the device may be a mobile phone, preferably a smartphone.

Further features according to the invention result from the claims, the embodiments and the FIGURES.

In the following, the invention is described with reference to an exemplary and non-exclusive embodiment.

FIG. 1 shows an exemplary embodiment of a method according to the invention with reference to a block diagram.

The schematic block diagram in FIG. 1 shows a smartphone 11 with an image recording unit 1 in the form of a camera, a data processing unit 2, a user interface 3 in the form of a touch screen and a communication unit 4 in the form of a mobile communication interface or WLAN interface. Further, a location sensor 8 is provided in smartphone 11.

Further, unseparated waste including a plurality of waste objects 6, 6', 6", for example, organic waste, and objects made of metal, glass, and plastic, is shown. The smartphone 11 uses the image recording unit 1 to create an image 5 of the unseparated waste and transmits this image 5 to the data processing unit 2.

The data processing unit 2 is connected to a neural image recognition network 7, to which it transmits the image 5. The data processing unit 2 also receives the current geographical location P of the smartphone 11 from an integrated location sensor 8.

In other embodiments of the invention the geographical location P is provided by a database 9 connected to the data processing unit 2 via a communication unit 4, i.e. a database 9 located on a server 10 on the Internet. For this purpose, the data processing unit 2 transmits the user data of the current user to the server 10, whereupon data on the location of the user stored in the database 9 (e.g., home address) is provided. This kind of communication is schematically indicated in FIG. 1, as it is not mandatory for each embodiment of the invention.

The data processing unit 2 receives information about the waste objects 6, 6', 6" detected in the image 5 from the image recognition network 7, e.g., that they are a beverage can, a battery and a banana peel, respectively. The data processing unit 2 creates from the image 5 a series of image sections 5', each of which contains the relevant waste objects 6, 6', 6", and transmits these image sections 5' together with the location P to a neural waste classification network 7'. In other embodiments not described herein, it may be provided that the classification is done by way of a database connected to the data processing unit 2 instead of using a neural network.

On the basis of the transmitted image sections 5' and the geographical location P, the neural waste classification network 7' now classifies the waste objects 6, 6', 6" detected in image 5 into predefined waste categories $K_1$, $K_2$, . . . , $K_n$.

The neural waste classification network 7' was trained in advance using training data specially adapted for detecting waste objects. For this purpose, the training data of the neural waste classification network 7' provided according to the invention comprises not only photos of various objects (organic waste, glass, plastic, paper, metal, batteries, etc.), but also their respective assignment to predefined waste categories depending on the geographical location P. For example, the waste object "metal" is assigned to the waste category $K_7$ at a first location $P_1$, whereas it is assigned to the waste category $K_3$ at a second location $P_2$.

The waste category $K_i$ determined by the neural waste classification network 7' is transmitted back to the data processing unit 2. Then the data processing unit 2 creates a modified image 5", which is an overlay of the original image 5 with the detected waste objects 6, 6', 6". For example, in the modified image 5", each waste object detected in the unseparated waste may have a visually prominent frame or the like in order to make it clear to the user that this object marked in this way has been detected as a waste object 6, 6', 6".

The modified image 5" is transmitted to the user interface 3, namely to the touch screen of the smartphone 11, and the user is prompted to select at least one of the waste objects 6, 6', 6" marked in the modified image 5". When the user selects one of the marked waste objects 6, 6', 6", the waste category $K_1, K_2, \ldots, K_n$ of the selected waste object 6, 6', 6" is displayed on the user interface 3, so that the user receives basic information as to which waste category $K_i$ the selected waste object belongs to at their location.

The data processing unit 2 then establishes a connection with an external database 9', which is located on a server on the Internet 10, via the communication unit 4. The data processing unit 2 transmits the determined waste category $K_i$ and the location P and receives information I from the database 9' regarding the disposal of the corresponding waste category $K_i$ at the specific location P. This information I is received by the data processing unit 2 and displayed on the user interface 3. This provides the user with detailed information on how to deal with the determined waste category $K_i$ at his location. This may include e.g., information about nearby collection centres or collection days of this waste category.

Further, the data processing unit 2 establishes a connection with an external database 9", which is located on a server on the Internet 10, via the communication unit 4. The data processing unit 2 transmits the waste category $K_i$ and the location P and receives information from the database 9' regarding the local provider for disposal of the waste category $K_i$ at the specific location P.

This information A is received by the data processing unit 2 and displayed on the user interface 3.

In other embodiments not shown herein, it may be provided that, via communication unit 4, the data processing unit 2 sends an electronic order to one of the determined providers A for disposal of the waste object 6, 6', 6" selected by the user.

The invention is not limited to the described exemplary embodiments, but also comprises further embodiments of the present invention within the scope of the following patent claims.

The invention claimed is:

1. A computer-implemented method for classifying waste into predefined waste categories $K_1, K_2, \ldots, K_n$ using an image recording unit and a data processing unit, wherein the method comprises:

recording, by way of the image recording unit, an image of unseparated waste that is to be separated, the unseparated waste comprising waste objects;

detecting, by way of a neural image recognition network that is connected to the data processing unit or integrated into the data processing unit, the waste objects that are depicted in the image; and classifying at least one of the waste objects into one of the predefined waste categories $K_1, K_2, \ldots, K_n$;

wherein the waste objects are classified into one of the predefined waste categories $K_1, K_2, \ldots, K_n$ on the basis of a geographical location "P" the geographical location of the image recording unit or the unseparated waste, wherein the predefined waste categories comprise at least residual waste, organic waste, paper, plastic, glass, and hazardous waste, wherein the geographical location "P" is provided by a location sensor that is connected to the data processing unit, and wherein a database, which is connected to the data processing unit or integrated into the data processing unit and in which a relationship between the location "P", predefined waste objects, and the predefined waste categories $K_1, K_2, \ldots, K_n$ is stored, is used to classify the waste objects into one of the predefined waste categories $K_1, K_2, \ldots, K_n$.

2. The method according to claim 1, wherein a neural waste classification network, which is connected to the data processing unit or integrated into the data processing unit and has been trained with training data mapping a relationship between the location "P", predefined waste objects and the waste categories $K_1, K_2, \ldots, K_n$, is used to classify the waste objects into one of the predefined waste categories $K_1, K_2, \ldots, K_n$.

3. The method according to claim 1, wherein the image recognition network or the data processing unit creates from the image sections displaying detected waste objects and uses these image sections to classify the detected waste objects.

4. The method according to claim 1, wherein the geographical location "P" is provided by a database connected to the data processing unit via a communication unit, wherein the database is located on a server on the Internet, on the basis of user data stored in the data processing unit.

5. The method according to claim 1, wherein the data processing unit creates a modified image comprising the image that highlights the waste objects detected in the image and in that the modified image is displayed on a user interface, particularly on a touch screen and the user is prompted to select at least one of the highlighted waste objects in the modified image, whereupon the classified waste category $K_1, K_2, \ldots, K_n$ of the selected waste object is displayed on the user interface.

6. The method according to claim 5, wherein, by querying a database connected to the data processing unit via a communication unit, the database being located on a server on the Internet, information I relating to the disposal of the waste object is determined on the basis of the waste categories $K_1, K_2, \ldots, K_n$ determined for the waste object selected by the user and the location "P" and this information I is displayed on the user interface.

7. The method according to claim 1, wherein the data processing unit selects a local provider "A" for the disposal of the waste object selected by the user by querying a database connected to the data processing unit via a communication unit, the database being located on a server on the Internet, and displays the determined provider on the user interface.

8. The method according to claim 7, wherein the data processing unit ends an electronic order via a communication unit to the provider "A" for the disposal of the classified waste object.

9. A non-transitory computer-readable storage medium comprising instructions which cause an electronic device comprising an image recording unit and a data processing unit to employ a method comprising recording, by way of the image recording unit, an image of unseparated waste that is to be separated, the waste comprising waste objects;

detecting, by way of a neural image recognition network that is connected to the data processing unit or integrated into the data processing unit, the waste objects depicted in the image; and classifying at least one of the waste objects into one of the predefined waste categories $K_1$, $K_2$, . . . , $K_n$;

wherein the waste objects are classified into one of the predefined waste categories $K_1$, $K_2$, . . . , $K_n$ on the basis of a geographical location "P" of the image recording unit or the unseparated waste, wherein the predefined waste categories comprise at least residual waste, organic waste, paper, plastic, glass, and hazardous waste, wherein the geographical location "P" is provided by a location sensor that is connected to the data processing unit, wherein a database, which is connected to the data processing unit or integrated into the data processing unit and in which a relationship between the location "P", predefined waste objects and the predefined waste categories $K_1$, $K_2$, . . . , $K_n$ is stored, is used to classify the waste objects into one of the predefined waste categories $K_1$, $K_2$, . . . , $K_n$.

10. A device for classifying waste comprising an image recording unit and a data processing unit wherein the device is configured to employ a method comprising recording, by way of the image recording unit, an image of unseparated waste that is to be separated, the waste comprising waste objects;

detecting, by way of a neural image recognition network that is connected to the data processing unit or integrated into the data processing unit, the waste objects depicted in the image; and classifying at least one of the waste objects into one of the predefined waste categories $K_1$, $K_2$, . . . , $K_n$;

wherein the waste objects are classified into one of the predefined waste categories $K_1$, $K_2$, . . . , $K_n$ on the basis of a geographical location "P" of the image recording unit or the unseparated waste;

wherein the predefined waste categories comprise at least residual waste, organic waste, paper, plastic, glass, and hazardous waste; wherein the geographical location "P" is provided by a location sensor connected to the data processing unit, and wherein a database, which is connected to the data processing unit or integrated into the data processing unit and in which a relationship between the location "P", predefined waste objects, and the predefined waste categories $K_1$, $K_2$, . . . , $K_n$ is stored, is used to classify the waste objects into one of the predefined waste categories $K_1$, $K_2$, . . . , $K_n$.

11. The device according to claim 10, wherein the device comprises a mobile phone and wherein the mobile phone comprises a smartphone comprising a user interface and a communication unit.

* * * * *